US012704646B2

(12) United States Patent
Shah et al.

(10) Patent No.: US 12,704,646 B2
(45) Date of Patent: Aug. 11, 2026

(54) GNSS DEVIATION MAP LAYER

(71) Applicant: Ford Global Technologies, LLC, Dearborn, MI (US)

(72) Inventors: Sharnam Shah, San Francisco, CA (US); Ankit Girish Vora, Northville, MI (US); Ganesh Kumar, Santa Clara, CA (US); Nalin Bendapudi, Ann Arbor, MI (US); Md Nahid Pervez, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 18/416,964

(22) Filed: Jan. 19, 2024

(65) Prior Publication Data

US 2025/0237767 A1 Jul. 24, 2025

(51) Int. Cl.
*G01S 19/40* (2010.01)
*G01C 21/30* (2006.01)
*G01S 19/45* (2010.01)

(52) U.S. Cl.
CPC .............. *G01S 19/40* (2013.01); *G01C 21/30* (2013.01); *G01S 19/45* (2013.01)

(58) Field of Classification Search
None
See application file for complete search history.

(56) References Cited

U.S. PATENT DOCUMENTS 9,684,081 B2 * 6/2017 Giurgiu .................. G01S 19/40
10,267,634 B2 * 4/2019 Chen .................. G01C 21/3602
11,280,609 B2 * 3/2022 Chen ...................... G06V 20/56
11,592,517 B2 2/2023 Wirola et al.
12,259,464 B2 * 3/2025 Kulkarni .............. G01S 13/581
(Continued)

FOREIGN PATENT DOCUMENTS

CN 114880334 A 8/2022
CN 115164886 A 9/2023
(Continued)

OTHER PUBLICATIONS

Li et al., "LD-SLAM: A Robust and Accurate GNSS-Aided Multi-Map Method for Long-Distance Visual SLAM", Visual SLAM. Remote Sens. 2023, 15, 4442. https://doi.org/10.3390/rs15184442, https://www.mdpi.com/journal/remotesensing.
(Continued)

*Primary Examiner* — Bernarr E Gregory
(74) *Attorney, Agent, or Firm* — Frank A. MacKenzie; Brooks Kushman P.C.

(57) ABSTRACT

A computer includes a processor and a memory, and the memory stores instructions executable by the processor to receive a positional deviation for a vehicle and update a classification of a geographic area in a GNSS deviation map layer based on the positional deviation. The positional deviation is based on sensor data generated by environmental sensors on board the vehicle, map data, and global navigation satellite system (GNSS) data received at the vehicle. The positional deviation indicates a difference between a GNSS pose of the vehicle derived from the GNSS data and a localized position of the vehicle indicated by the sensor data and the map data. The GNSS deviation map layer indicates a reliability of the GNSS data.

20 Claims, 4 Drawing Sheets

(56) References Cited

U.S. PATENT DOCUMENTS

| | | | | |
|---|---|---|---|---|
| 2011/0202271 | A1* | 8/2011 | Kruithof ............ | G01C 21/3841 701/533 |
| 2014/0074847 | A1* | 3/2014 | Martens ............ | G01C 21/3841 707/740 |
| 2017/0131409 | A1 | 5/2017 | Irish et al. | |
| 2019/0107630 | A1 | 4/2019 | Madhow et al. | |
| 2019/0129040 | A1 | 5/2019 | He et al. | |
| 2019/0242710 | A1 | 8/2019 | Irish et al. | |
| 2020/0011684 | A1* | 1/2020 | McErlain, II ...... | G01C 21/3841 |
| 2021/0063198 | A1 | 3/2021 | Nister et al. | |
| 2021/0095992 | A1* | 4/2021 | Kitaura .................. | G06T 7/579 |
| 2021/0116579 | A1 | 4/2021 | Rezaei | |
| 2021/0142077 | A1 | 5/2021 | Cox et al. | |
| 2021/0302170 | A1* | 9/2021 | Xie .................... | G01C 21/3804 |
| 2022/0091280 | A1 | 3/2022 | Nurminen et al. | |
| 2022/0214187 | A1 | 7/2022 | Liu et al. | |
| 2022/0373687 | A1 | 11/2022 | Yang et al. | |
| 2023/0196787 | A1 | 6/2023 | Agrawal et al. | |

FOREIGN PATENT DOCUMENTS

| | | | |
|---|---|---|---|
| EP | 3739293 | A1 | 11/2020 |
| WO | 2018142194 | A1 | 8/2018 |
| WO | 2018213969 | A1 | 11/2018 |
| WO | 2020041668 | A1 | 2/2020 |

OTHER PUBLICATIONS

Reid et al., Proceedings of the 32nd International Technical Meeting of the Satellite Division of The Institute of Navigation (Ion GNSS+ 2019), Miami, Florida, Sep. 2019, pp. 2135-2158. https://doi.org/10.33012/2019.16914.

* cited by examiner

GNSS DEVIATION MAP LAYER

BACKGROUND

A global navigation satellite system (GNSS) can be used for detecting a position relative to the earth. Systems for GNSS include the global positioning system (GPS), GLONASS, BeiDou, Galileo, etc. GNSS satellites broadcast time and geolocation data. GNSS receivers can determine a position, e.g., latitude and longitude, based on receiving the time and geolocation data from multiple GNSS satellites simultaneously and using principles of trilateration.

DETAILED DESCRIPTION

Figure 1:
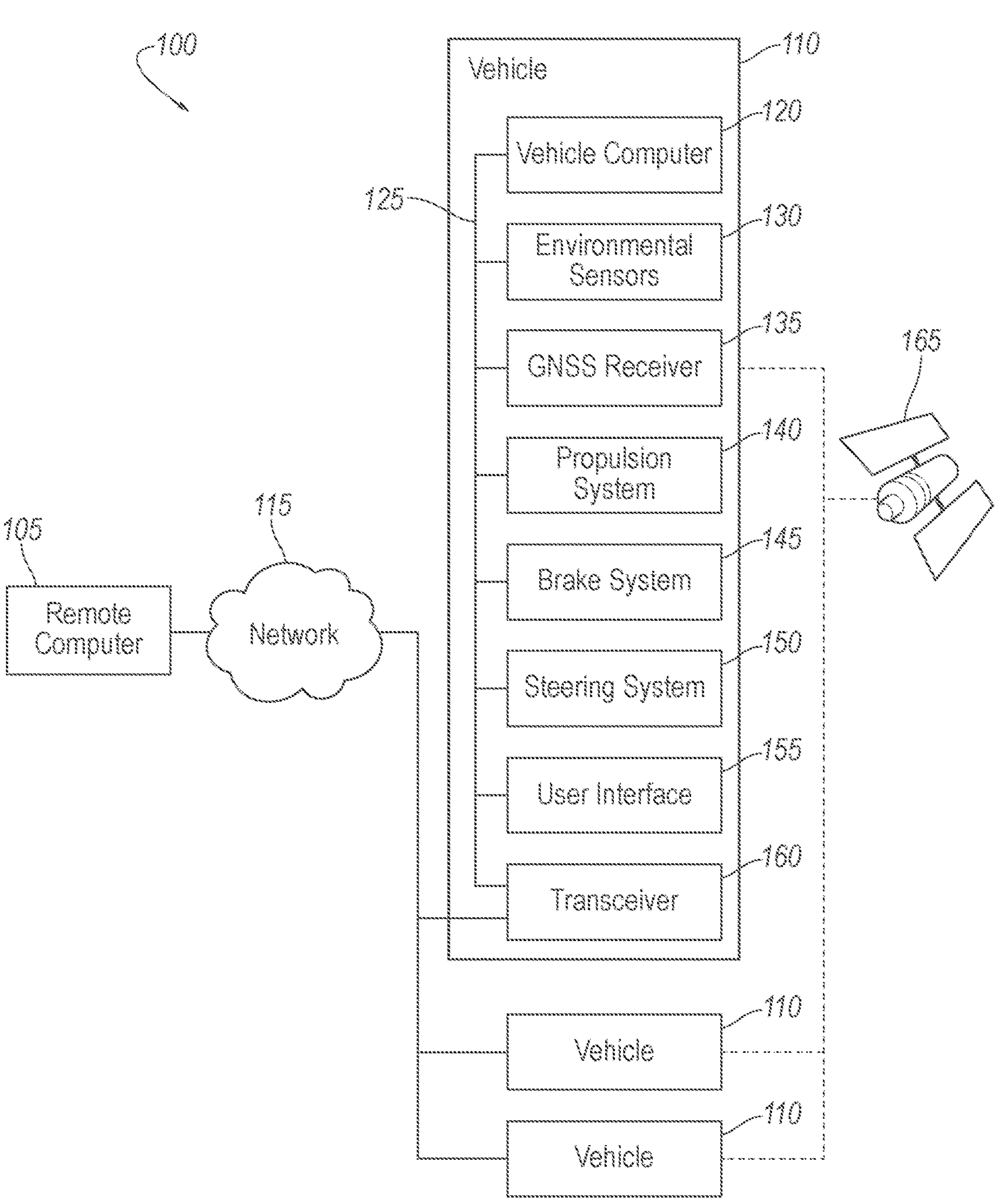
FIG. 1 is a block diagram of a system with a remote computer and a plurality of vehicles.

This disclosure describes techniques for tracking and independently verifying the reliability of data received from a global navigation satellite system (GNSS). GNSS data can vary in accuracy from place to place and time to time. Some GNSS receivers can generate a measure of the uncertainty of the GNSS data based on the GNSS data, but such measures may not reflect all the factors generating uncertainty. The techniques herein provide a way to test the reliability of the GNSS data against data from other sources. The reliability of the GNSS data may be tracked in a GNSS deviation map layer. The GNSS deviation map layer can track classifications of geographic areas, and each classification can indicate the reliability of the GNSS data within the corresponding geographic area. A computer may be programmed to receive positional deviations for a plurality of vehicles and update the classifications of the geographic areas in the GNSS deviation map layer based on the positional deviations. Each positional deviation indicates a difference between a GNSS pose of the vehicle derived from the GNSS data and a localized position of the vehicle indicated by the sensor data and the map data. Each positional deviation is based on map data, sensor data generated by environmental sensors on board the respective vehicle, and GNSS data received at the vehicle. The combination of the sensor data and the map data implies the localized position of the vehicle, and this implicit localized position provides an independent assessment of the GNSS pose resulting from the GNSS data. An inaccuracy of the GNSS pose versus the implicit localized position results in the positional deviation. The use of positional deviations from multiple vehicles may help update the GNSS deviation map layer in real time.

The GNSS deviation map layer may help with various GNSS-based vehicle operation, navigation, and mapping applications. For example, the GNSS deviation map layer may provide an input to an advanced driver assistance system (ADAS) on board the vehicle. The GNSS pose may be used by the ADAS feature when the classification from the GNSS deviation map layer indicates a high reliability, and the ADAS feature may be deactivated or may use different inputs when the GNSS deviation map layer indicates a lower reliability. For another example, the GNSS deviation map layer may be an input for turn-by-turn navigation. A navigation system may provide lane-level navigation instructions when the classification from the GNSS deviation map layer indicates a high reliability and may provide road-level navigation instructions when the classification from the GNSS deviation map layer indicates a lower reliability. For another example, a mapping application may display the classification from the GNSS deviation map layer when displaying the GNSS pose in order to provide context to the user for the GNSS pose.

A computer includes a processor and a memory, and the memory stores instructions executable by the processor to receive a positional deviation for a vehicle and update a classification of a geographic area in a GNSS deviation map layer based on the positional deviation. The positional deviation is based on sensor data generated by environmental sensors on board the vehicle, map data, and global navigation satellite system (GNSS) data received at the vehicle. The positional deviation indicates a difference between a GNSS pose of the vehicle derived from the GNSS data and a localized position of the vehicle indicated by the sensor data and the map data. The GNSS deviation map layer indicates a reliability of the GNSS data.

In an example, the instructions may further include instructions to update the classification based on the positional deviation and based on a covariance of the GNSS data received at the vehicle. In a further example, the instructions may further include instructions to select a first potential classification as the classification in response to the positional deviation exceeding a first threshold and the covariance being below a second threshold, and select a second potential classification as the classification in response to the positional deviation exceeding the first threshold and the covariance exceeding the second threshold.

In an example, the vehicle may be a first vehicle of a plurality of vehicles, the positional deviation may be a first positional deviation of a plurality of positional deviations of the respective vehicles, the classification may be a first classification of a plurality of classifications of the GNSS deviation map layer, and the instructions may further include instructions to update the classifications based on the positional deviations. In a further example, the geographic area may be a first geographic area, the classifications may include a second classification of a second geographic area that lacks any of the vehicles, and the instructions may further include instructions to update the second classification by executing a machine-learning program that generates an output indicating an expected classification. In a yet further example, the instructions may further include instructions to train the machine-learning program with the positional deviations as training data.

In another yet further example, the instructions may further include instructions to update the second classification by executing the machine-learning program in response to the second classification of the second geographic area before the update indicating that the reliability of the GNSS data is low.

In another further example, the geographic area may be a first geographic area, the classifications may include a second classification of a second geographic area that lacks any of the vehicles, and the instructions may further include instructions to maintain the second classification at the same value as before the update in response to the second classification of the second geographic area before the update indicating that the reliability of the GNSS data is high.

In an example, the instructions may further include instructions to determine the positional deviation based on the sensor data, the map data, and the GNSS data. In a further example, the instructions may further include instructions to determine the positional deviation by detecting features in the sensor data, the positional deviation being a difference between expected positions of the features based on the GNSS data and map positions of the features from the map data. In a yet further example, the instructions may further include instructions to determine the positional deviation by determining the expected positions of the features based on the GNSS pose of the vehicle derived from the GNSS data. In a still yet further example, the instructions may further include instructions to determine the positional deviation by executing an optimization algorithm matching the expected positions to the map positions.

In an example, the instructions may further include instructions to select the classification from a preset plurality of potential classifications stored in the memory. In a further example, the potential classifications may include at least one first potential classification indicating that the reliability is at least suitable for road-level position detection and at least one second potential classification indicating that the reliability is unsuitable for road-level position detection. In a yet further example, the potential classifications may include at least one third potential classification indicating that the reliability is at least suitable for lane-level position detection.

In another further example, the potential classifications may include at least one first potential classification indicating that the positional deviation is above a threshold and at least one second potential classification indicating that the positional deviation is below the threshold. In a yet further example, the threshold may be a first threshold, the at least one second potential classification may indicate that the positional deviation is below the first threshold and above a second threshold, and the potential classifications may include at least one third potential classification indicating that the positional deviation is below the second threshold.

A method includes receiving a positional deviation for a vehicle and updating a classification of a geographic area in a GNSS deviation map layer based on the positional deviation. The positional deviation is based on sensor data generated by environmental sensors on board the vehicle, map data, and global navigation satellite system (GNSS) data received at the vehicle. The positional deviation indicates a difference between a GNSS pose of the vehicle derived from the GNSS data and a localized position of the vehicle indicated by the sensor data and the map data. The GNSS deviation map layer indicates a reliability of the GNSS data.

In an example, the method may further include determining the positional deviation by detecting features in the sensor data, the positional deviation indicating a difference between expected positions of the features based on the GNSS data and map positions of the features from the map data. In a further example, the method may further include determining the positional deviation by determining the expected positions of the features based on the GNSS pose of the vehicle derived from the GNSS data.

With reference to the Figures, wherein like numerals indicate like parts throughout the several views, a remote computer 105 includes a processor and a memory, and the memory stores instructions executable by the processor to receive at least one positional deviation for at least one vehicle 110 and update a classification of a geographic area 310 in a GNSS deviation map layer 300 based on the positional deviation(s). Each positional deviation is based on sensor data generated by environmental sensors 130 on board the respective vehicle 110, map data, and global navigation satellite system (GNSS) data received at the vehicle 110. The positional deviation indicates a difference between a GNSS pose of the vehicle 110 derived from the GNSS data and a localized position of the vehicle 110 indicated by the sensor data and the map data. The GNSS deviation map layer 300 indicates a reliability of the GNSS data.

With reference to FIG. 1, a system 100 includes the remote computer 105 and a plurality of the vehicles 110 in communication with the remote computer 105. The remote computer 105 is a microprocessor-based computing device, e.g., a generic computing device including a processor and a memory. The memory of the remote computer 105 can include media for storing instructions executable by the processor as well as for electronically storing data and/or databases, and/or the remote computer 105 can include structures such as the foregoing by which programming is provided. The remote computer 105 can be multiple computers coupled together.

The remote computer 105 and the vehicles 110 may be communicatively coupled via a network 115. The network 115 represents one or more mechanisms by which the remote computer 105 may communicate with the vehicles 110. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, IEEE 802.11, etc.), local area networks (LAN) and/or wide area networks (WAN), including the Internet, providing data communication services.

The vehicles 110 may be any passenger or commercial automobiles such as cars, trucks, sport utility vehicles, crossovers, vans, minivans, taxis, buses, etc. Each vehicle 110 may include a vehicle computer 120, a communications network 125, the environmental sensors 130, a GNSS receiver 135, a propulsion system 140, a brake system 145, a steering system 150, a user interface 155, and a transceiver 160.

The vehicle computer 120 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 120 can thus include a processor, a memory, etc. The memory of the vehicle computer 120 can include media for storing instructions executable by the processor as well as for electronically storing data and/or databases, and/or the vehicle computer 120 can include structures such as the foregoing by which programming is provided. The vehicle computer 120 can be multiple computers coupled together on board the vehicle 110.

The vehicle computer 120 may transmit and receive data on board the vehicle 110 through the communications network 125. The communications network 125 may be, e.g., a controller area network (CAN) bus, Ethernet, WiFi, Local Interconnect Network (LIN), onboard diagnostics connector (OBD-II), and/or any other wired or wireless communications network. The vehicle computer 120 may be communicatively coupled to the environmental sensors 130, the GNSS receiver 135, the propulsion system 140, the brake system 145, the steering system 150, the user interface 155, the transceiver 160, and other components via the communications network 125.

The environmental sensors 130 may detect the external world, e.g., objects and/or characteristics of surroundings of the vehicle 110, such as other vehicles, road lane markings, traffic lights and/or signs, road users, etc. For example, the environmental sensors 130 may include radar sensors, ultrasonic sensors, scanning laser range finders, light detection and ranging (lidar) devices, and image processing sensors such as cameras. The radar sensors transmit radio waves and receive reflections of those radio waves to detect physical objects in the environment. The radar sensors can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. The ultrasonic sensors measure distances to features of the environment by emitting ultrasonic sound waves and converting the reflected sound into an electrical signal. The ultrasonic sensors may be any suitable type, e.g., a field of view with a comparatively wide horizontal angle and narrow vertical angle. The cameras may detect visible light, infrared radiation, ultraviolet light, or some range of wavelengths including visible, infrared, and/or ultraviolet light. For example, the cameras can be a charge-coupled devices (CCD), complementary metal oxide semiconductors (CMOS), or any other suitable type. The lidar devices detect distances to objects by emitting laser pulses at a particular wavelength and measuring the time of flight for the pulse to travel to the object and back. The lidar devices can be any suitable type for providing the lidar data on which the vehicle computer 120 can act, e.g., spindle-type lidar, solid-state lidar, flash lidar, etc.

The GNSS receiver 135 receives data from GNSS satellites 165. Systems for GNSS include the global positioning system (GPS), GLONASS, BeiDou, Galileo, etc. The GNSS satellites 165 broadcast time and geolocation data. The GNSS receiver 135 can determine a GNSS pose of the vehicle 110, e.g., latitude and longitude, based on receiving the time and geolocation data from multiple GNSS satellites 165 simultaneously and using principles of trilateration.

The propulsion system 140 of the vehicle 110 generates energy and translates the energy into motion of the vehicle 110. The propulsion system 140 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 140 can include an electronic control unit (ECU) or the like that is in communication with and receives input from the vehicle computer 120 and/or a human operator. The human operator may control the propulsion system 140 via, e.g., an accelerator pedal and/or a gear-shift lever.

The brake system 145 is typically a conventional vehicle braking subsystem and resists the motion of the vehicle 110 to thereby slow and/or stop the vehicle 110. The brake system 145 may include friction brakes such as disc brakes, drum brakes, band brakes, etc.; regenerative brakes; any other suitable type of brakes; or a combination. The brake system 145 can include an electronic control unit (ECU) or the like that is in communication with and receives input from the vehicle computer 120 and/or a human operator. The human operator may control the brake system 145 via, e.g., a brake pedal.

The steering system 150 is typically a conventional vehicle steering subsystem and controls the turning of the wheels. The steering system 150 may be a rack-and-pinion system with electric power-assisted steering, a steer-by-wire system, as both are known, or any other suitable system. The steering system 150 can include an electronic control unit (ECU) or the like that is in communication with and receives input from the vehicle computer 120 and/or a human operator. The human operator may control the steering system 150 via, e.g., a steering wheel.

The user interface 155 presents information to and receives information from an operator of the vehicle 110. The user interface 155 may be located, e.g., on an instrument panel in a passenger compartment of the vehicle 110, or wherever may be readily seen by the operator. The user interface 155 may include dials, digital readouts, screens, speakers, and so on for providing information to the operator, e.g., human-machine interface (HMI) elements such as are known. The user interface 155 may include buttons, knobs, keypads, microphone, and so on for receiving information from the operator.

The transceiver 160 connects the vehicle 110 to the remote computer 105 via the network 115. The transceiver 160 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 160 may be adapted to communicate with a remote server, that is, a server distinct and spaced from the vehicle 110. The remote server may be located outside the vehicle 110, such as, e.g., the remote computer 105. For example, the remote server may be associated with another vehicle (e.g., V2V communications), an infrastructure component (e.g., V2I communications), an emergency responder, a mobile device associated with the owner of the vehicle 110, etc. The transceiver 160 may be one device or may include a separate transmitter and receiver.

Figure 2:
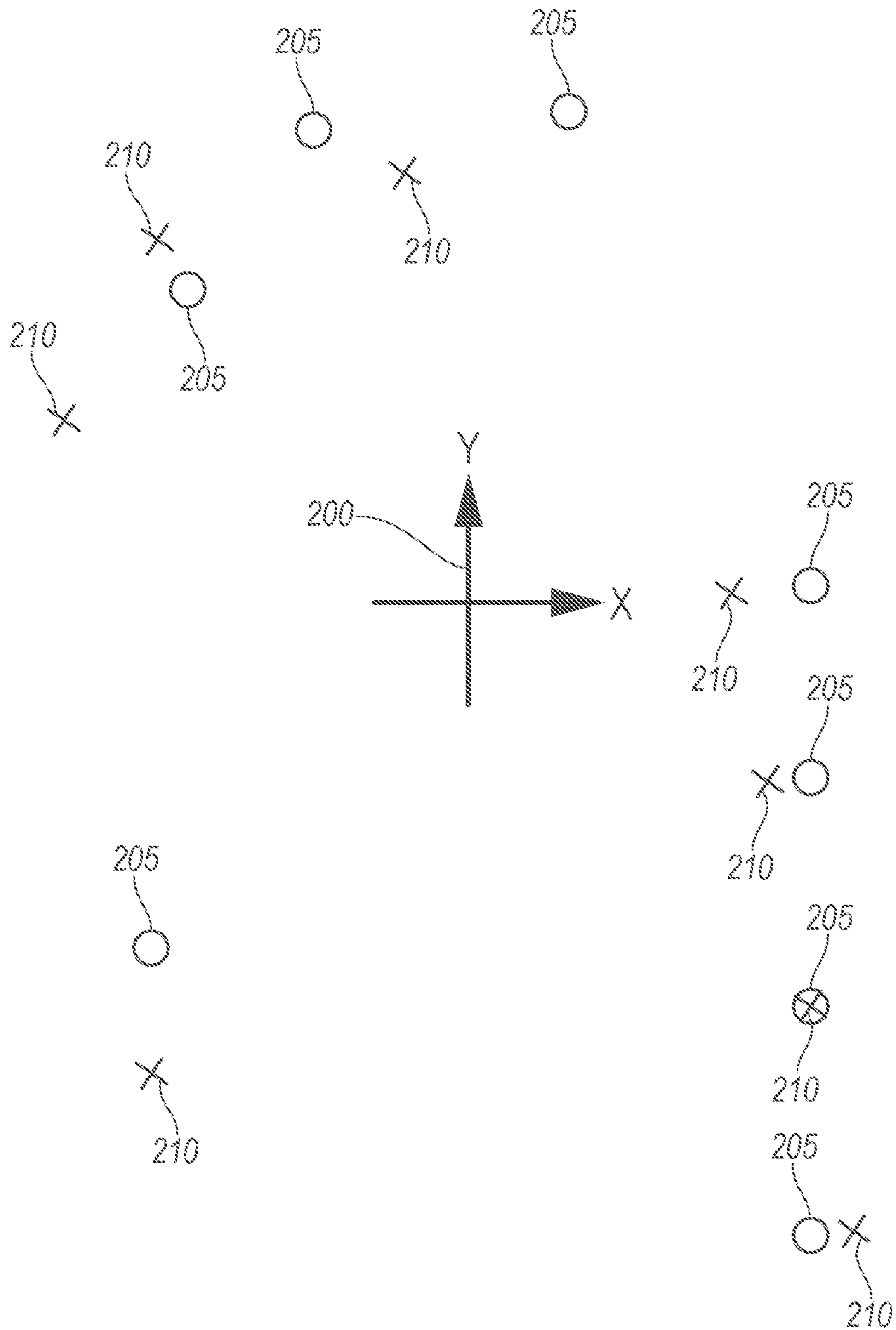
FIG. 2 is a diagram of features of the environment of one of the vehicles as indicated by sensors of the vehicle and as indicated by map data.

With reference to FIG. 2, the positional deviation indicates a difference between the GNSS pose of the vehicle 110 derived from the GNSS data and a localized position of the vehicle 110 indicated by the sensor data and the map data. In other words, the positional deviation provides a measure of the accuracy of the GNSS pose, with the combination of the sensor data and the map data serving as a baseline. The positional deviation can serve as an additional manner of assessing the GNSS pose besides the covariance of the GNSS data (described below), which may not always indicate situations of lowered accuracy.

As a general overview, the vehicle computer 120 or the remote computer 105 may determine the positional deviation for the vehicle 110 based on the sensor data generated by the environmental sensors 130 on board the vehicle 110, the map data, and the GNSS data received at the vehicle 110. The vehicle computer 120 or GNSS receiver 135 determines the GNSS pose of the vehicle 110. The vehicle computer 120 or remote computer 105 has access to map data indicating map positions 205 of features of the environment surrounding the vehicle 110. The vehicle computer 120 or remote computer 105 detects the features in the sensor data from the environmental sensors 130, determines expected positions 210 of the features based on the GNSS pose of the vehicle 110, and executes an optimization algorithm matching the expected positions 210 of the features to the map positions 205 of the features. The positional deviation is a difference between the expected positions 210 and the map positions 205.

For example, each vehicle computer 120 may determine the positional deviation for the respective vehicle 110 and transmit the positional deviation to the remote computer 105. This arrangement may distribute the computing steps among the vehicles 110 and provide a manageable level of computing steps for the remote computer 105 to perform to generate the GNSS deviation map layer 300 (described below). Alternatively, each vehicle computer 120 may transmit the GNSS pose and the sensor data from the environmental sensors 130 to the remote computer 105, and the remote computer 105 may determine the positional deviations for all the vehicles 110.

The vehicle computer 120 or GNSS receiver 135 determines the GNSS pose of the vehicle 110 from the GNSS data received by the GNSS receiver 135 of the vehicle 110. The GNSS pose describes the position and/or orientation of the vehicle 110, e.g., two horizontal spatial dimensions such as latitude and longitude and one angular dimensions such as heading, or three spatial dimensions and three angular dimensions. The vehicle computer 120 or GNSS receiver 135 uses trilateration to determine the GNSS pose, as is known. The GNSS pose may be specified in an absolute coordinate system 200, i.e., a coordinate system that is fixed with respect to the earth.

The vehicle computer 120 or remote computer 105 receives the sensor data from the environmental sensors 130. The sensor data may be, e.g., image data and/or range data.

Image data are a sequence of image frames of the fields of view of the respective environmental sensors 130, e.g., cameras. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in an image frame, i.e., position in the field of view of the environmental sensor 130 at the time that the image frame was recorded, can be specified in pixel dimensions or coordinates, e.g., an ordered pair of pixel distances, such as a number of pixels from a top edge and a number of pixels from a left edge of the image frame.

The range data may be, e.g., a point cloud. The points of the point cloud specify respective positions in the environment relative to the position of the environmental sensor 130, e.g., radar sensor, lidar device, or ultrasonic sensor. For example, the range data can be in spherical coordinates with the environmental sensor 130 at the origin of the spherical coordinate system. The spherical coordinates can include a radial distance, i.e., a measured depth from the environmental sensor 130 to the point measured by the environmental sensor; a polar angle, i.e., an angle from a vertical axis through the environmental sensor 130 to the point measured by the environmental sensor; and an azimuthal angle, i.e., an angle in a horizontal plane from a horizontal axis through the environmental sensor 130 to the point measured by the environmental sensor 130. The horizontal axis can be, e.g., along a vehicle-forward direction. Alternatively, the environmental sensor 130 can return the points as Cartesian coordinates with the environmental sensor 130 at the origin or as coordinates in any other suitable coordinate system, or the vehicle computer 120 or remote computer 105 can convert the spherical coordinates to Cartesian coordinates or another coordinate system after receiving the range data.

The features may include objects or structures that are included in the map data. For example, the features may include traffic lights, traffic signs, lane boundaries, guardrails, buildings, etc.

The vehicle computer 120 or remote computer 105 can detect the features in the image data using conventional image-recognition techniques, e.g., a convolutional neural network programmed to accept an image as input and output an identification. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential identification of a feature, and the final output is the identification with the highest score. The vehicle computer 120 or remote computer 105 may use similar machine-learning techniques for the range data.

The vehicle computer 120 or remote computer 105 may perform sensor fusion of the image data and the range data. Sensor fusion is combining data from disparate sources together so that the resulting data has less uncertainty than if the data from each source were used individually, e.g., in creating a unified model of the surrounding environment of the vehicle 110. The sensor fusion can be performed with one or more algorithms, e.g., Kalman filter, central limit theorem, Bayesian networks, Dempster-Shafer, convolutional neural networks, etc. As a result of the sensor fusion, the range data may be associated with the features identified from the image data.

The vehicle computer 120 or remote computer 105 is programmed to determine the expected positions 210 of the features based on the GNSS pose of the vehicle 110. For example, the vehicle computer 120 or remote computer 105 may perform a geometric transformation on the range data for a feature. The range data may be specified in a relative coordinate system that is defined with respect to the vehicle 110, giving relative positions of the features. Treating the relative position of the feature as a vector, the relative position may be rotated according to the angular dimension (s) of the GNSS pose of the vehicle 110 and added to the position from the GNSS pose, resulting in the expected position 210 of the feature in the absolute coordinate system 200. The expected positions 210 are in the same coordinate system 200 as the map positions 205 and are thus comparable to the map positions 205.

The vehicle computer 120 or remote computer 105 can receive the map data or already have the map data stored in the memory. The map data may include the map positions 205 for the features. The map positions 205 may be specified with coordinates in the same coordinate system 200 as the GNSS pose is.

The vehicle computer 120 or remote computer 105 is programmed to determine the positional deviation based on the expected positions 210 and the map positions 205 of the features. The positional deviation is a difference between the expected positions 210 of the features based on the GNSS data and the map positions 205 of the features from the map data. For example, the positional deviation may be a geometric transformation that most closely converts the expected positions 210 to the corresponding map positions 205 (or vice versa). The geometric transformation may include a rotation and translation that, applied to the expected positions 210, makes the expected positions 210 coincide or nearly coincide with the map positions 205. When applied to the GNSS pose, the geometric transformation would generate a pose implied by using the sensor data to localize the vehicle 110 with respect to the map data. Thus, the positional deviation indicates a difference between the GNSS pose of the vehicle 110 and a localized position of the vehicle 110 indicated by the sensor data and the map data.

The vehicle computer 120 or remote computer 105 may determine the positional deviation by executing an optimization algorithm matching the expected positions 210 to the map positions 205. The optimization algorithm receives the expected positions 210 and the map positions 205 as inputs and returns the geometric transformation as an output. The optimization algorithm finds the geometric transformation that minimizes the differences between the expected positions 210 and the map positions 205. The optimization algorithm may be any suitable algorithm for optimization, e.g., for nonlinear optimization, e.g., nonlinear least squares regression. The optimization algorithm may instead be a machine-learning algorithm such as a neural network, e.g., deep neural network, artificial neural network, convolutional neural network, recurrent neural network, etc.; a support vector machine; a decision tree; etc.

Figure 3:
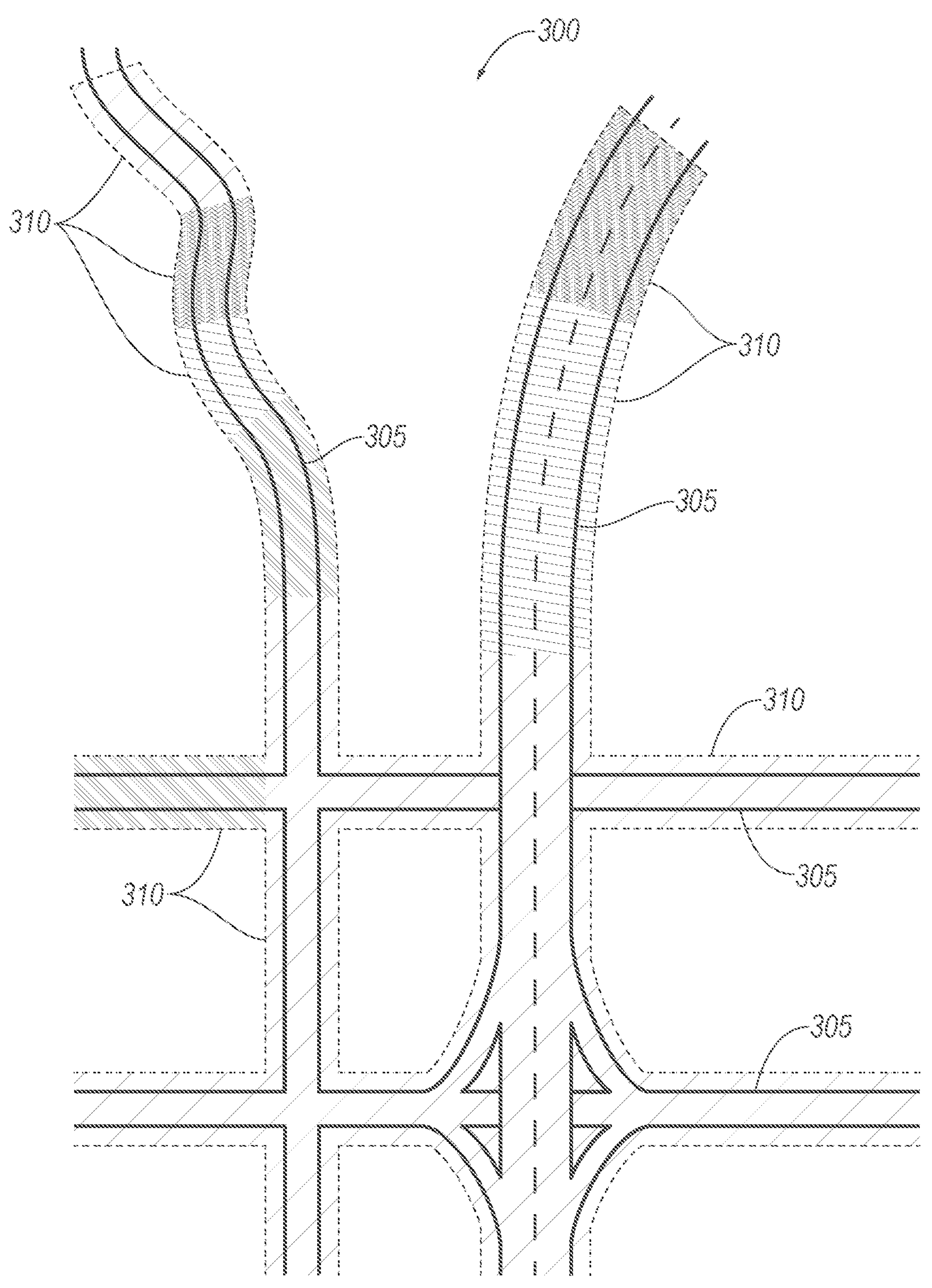
FIG. 3 is a diagram of a global navigation satellite system (GNSS) deviation map layer.

With reference to FIG. 3, the remote computer 105 uses a plurality of the positional deviations from a plurality of the vehicles 110 to construct and update a GNSS deviation map layer 300. The term "map layer" is used in its geographic information systems (GIS) sense as a database including images or groups of point, line, or area features that represent a class or type of entities and that are tied to a specific geographic location. For example, a set of map data may include map layers indicating streets, jurisdictional boundaries, property lines, traffic, weather, satellite imagery, elevation, etc. The GNSS deviation map layer 300 indicates a reliability of the GNSS data. For example, the GNSS deviation map layer 300 may include classifications applied to geographic areas 310, with each classification defining a range of reliability for the respective geographic area 310, as will be described in more detail below.

The remote computer 105 may receive a GNSS covariance. The GNSS covariance is a measure of the variability of the GNSS data. The GNSS covariance may be an output of the GNSS receiver 135 at each vehicle 110. Alternatively, the GNSS receiver 135 may output a different uncertainty measurement, and the vehicle computer 120 may be programmed to derive the GNSS covariance from the uncertainty measurement from the GNSS receiver 135. The vehicle computer 120 may be programmed to instruct the transceiver 160 to transmit the GNSS covariance to the remote computer 105, e.g., along with the positional deviation, or along with the GNSS pose and the sensor data.

The memory of the remote computer 105 may store a set of potential classifications that can be applied to the GNSS deviation map layer 300. The potential classifications can indicate whether the reliability of the GNSS data is suitable for position detection at different levels of precision, e.g., from more precise to less precise: suitable for lane-level position detection, suitable for road-level position detection, and unsuitable for road-level position detection. The suitability for position detection may be indicated by the positional deviation as well as possibly the GNSS covariance.

For example, the potential classifications may be divided based on one or more thresholds for the positional deviation, e.g., two thresholds. The thresholds may be chosen to correspond to suitability for vehicle operation, e.g., a first threshold to divide between suitable for road-level position detection and unsuitable for road-level position detection and a second threshold to divide between suitable for lane-level position detection and suitable for road-level position detection. The thresholds may be chosen based on known tolerances for navigating a vehicle 110 on a road 305 or in a lane, e.g., 5 meters for road-level position detection and 1.5 meters for lane-level position detection.

The potential classifications may also be divided based on one or more thresholds for the GNSS covariance, e.g., one threshold, which will be referred to as the third threshold. The third threshold may be chosen to correspond to suitability for vehicle operation, e.g., to divide between suitable for road-level position detection and unsuitable for road-level detection. The remote computer 105 may store one potential classification for each combination of level for the positional deviation and level for the GNSS covariance, e.g., six potential classifications for the examples of three levels for positional deviation and two levels for GNSS covariance: (1) a first potential classification for positional deviation above the first threshold and GNSS covariance above the third threshold, (2) a second potential classification for positional deviation between the first and second thresholds and GNSS covariance above the third threshold, (3) a third potential classification for positional deviation below the second threshold and GNSS covariance above the third threshold, (4) a fourth potential classification for positional deviation above the first threshold and GNSS covariance below the third threshold, (5) a fifth potential classification for positional deviation between the first and second thresholds and GNSS covariance below the third threshold, and (6) a sixth potential classification for positional deviation below the second threshold and GNSS covariance below the third threshold.

The GNSS deviation map layer 300 may include the classifications applied to geographic areas 310, and the remote computer 105 may update the classifications by selecting the classifications from the potential classifications stored in the memory, according to the criteria described below. The geographic areas 310 to which the classifications are applied may cover the entire area of the map or may be restricted to regions over which the vehicles 110 are likely to travel, e.g., along roads 305 as shown in FIG. 3. The classifications of the GNSS deviation map layer 300 may be initialized to the most recent classifications for the respective geographic areas 310 or, if none, a default classification. The default classification may be a potential classification indicating suitability for lane-level position detection, e.g., the sixth potential classification described above, for positional deviation below the second threshold and covariance below the third threshold.

The remote computer 105 is programmed to update the classifications in the GNSS deviation map layer 300 based on the positional deviations. As a general overview, the remote computer 105 receives a plurality of positional deviations from a plurality of the vehicles 110. The remote computer 105 updates the classifications for the geographic areas 310 that contain the vehicles 110 to match the positional deviations and covariances received from the respective vehicles 110. For geographic areas 310 that lack any of the vehicles 110, the remote computer 105 may either maintain the classification at the same value as before the update or to update the classification by executing a machine-learning program that generates an output indicating an expected classification; e.g., the remote computer 105 selects whether to maintain the classification or to execute the machine-learning program depending on the value of the pre-update classification or on a preset category for the geographic area 310.

The remote computer 105 is programmed to receive a positional deviation and a GNSS covariance from a vehicle 110 and update a classification of a geographic area 310 in the GNSS deviation map layer 300 based on the positional deviation and the GNSS covariance. The remote computer 105 may update the classification of the geographic area 310 containing the vehicle 110 based on the positional deviation and the GNSS covariance by selecting the classification from the preset plurality of potential classifications stored in the memory according to the positional deviation and GNSS covariance. The remote computer 105 may select the potential classification for which the positional deviation and GNSS covariance are within the threshold ranges, e.g., the second potential classification in response to the positional deviation being between the first and second thresholds and the GNSS covariance exceeding the third threshold, the fourth potential classification in response to the positional deviation exceeding the first threshold and the GNSS covariance being below the third threshold, etc. When one geographic area 310 has multiple vehicles 110 for which different classifications would be chosen, the remote computer 105 may update the classification for the geographic area 310 to be the less reliable of the classifications. Alternatively, the remote computer 105 may subdivide the geographic area 310 into two geographic areas 310 each containing one vehicle 110 and update the classification for each geographic area 310 based on the positional deviation and GNSS covariance received from the vehicle 110 in the respective geographic area 310.

The remote computer 105 may be programmed to, for each geographic area 310 that lacks any of the vehicles 110, determine whether to maintain the classification at the same value as before the update or to update the classification by executing the machine-learning program (both of which are described below). The determination may depend on the value of the pre-update classification. For example, the remote computer 105 may maintain the classification in response to the pre-update classification indicating that the reliability of the GNSS data is high (e.g., the pre-update classification being the fifth or sixth potential classification), and the remote computer 105 may update the classification with the machine-learning program in response to the pre-update classification indicating that the reliability of the GNSS data is low (e.g., the pre-update classification being the first, second, third, or fourth potential classification). Alternatively, the determination may depend on a preset category for the geographic area 310. The preset categories for the geographic areas 310 may be chosen based on whether the GNSS data for the geographic areas 310 generally has high reliability (e.g., generally flat areas) or sometimes has lower reliability (e.g., urban areas with tall buildings). The preset categories for the geographic areas 310 may be stored in the memory of the remote computer 105. The remote computer 105 may maintain the classification in response to the geographic area 310 being in the high-reliability category, and the remote computer 105 may update the classification with the machine-learning program in response to the geographic area 310 being in the lower-reliability category.

The remote computer 105 is programmed to update a classification for a geographic area 310 by executing the machine-learning program. The machine-learning program generates an output indicating an expected classification. For example, the machine-learning program may directly output the expected classification, which is then used as the classification for the geographic area 310. For another example, the machine-learning program may output an expected positional deviation for the geographic area 310. The remote computer 105 may then select the classification from the preset plurality of potential classifications stored in the memory according to the expected positional deviation. For example, the remote computer 105 may select the potential classification for which the expected positional deviation is within the threshold range (assuming a low GNSS covariance), e.g., the fourth potential classification in response to the expected positional deviation exceeding the first threshold, the fifth potential classification in response to the expected positional deviation being between the first and second thresholds, etc.

The remote computer 105 is programmed to execute the machine-learning program. The machine-learning program may be any suitable type for predicting the positional deviation that a vehicle 110 would return when traveling through a geographic area 310. For example, the machine-learning program may be a convolutional neural network that outputs a selected one of the potential classifications. For another example, the machine-learning program may be a regression network that outputs a numerical value for the expected positional deviation.

The machine-learning program may take the geographic area 310, elevation data for the geographic area 310, weather data for the geographic area 310, the current positions and orbits of the GNSS satellites 165, etc. as inputs. The elevation data may be stored in the memory of the remote computer 105 and may be derived from, e.g., topographical maps of the geographic area 310. The weather data may be received by the remote computer 105 via the network 115. The weather data may include data indicating cloud cover conditions and/or atmospheric models. The remote computer 105 may track the current positions of the GNSS satellites 165, as the orbits are known in advance.

The machine-learning program may be initially trained to replicate the positional deviations returned by the vehicles 110 or the classifications determined from those positional deviations. The training data may be a set of the positional deviations paired with the corresponding values of the inputs when those positional deviations were generated, e.g., the geographic area 310 in which the positional deviation was generated, the elevation data for that geographic area 310, the weather in the geographic area 310 at the time that the positional deviation was generated, and the positions of the GNSS satellites 165 at the time that the positional deviation was generated. The set of the positional deviations serves as the ground truth that the machine-learning program is trained to replicate. The machine-learning program may be trained via, e.g., backpropagation.

After the machine-learning program is initially trained and installed on the remote computer 105, the remote computer 105 may further train the machine-learning program with the positional deviations received by the remote computer 105 as training data. The retraining by the remote computer 105 may be performed in the same manner as the initial training, e.g., backpropagation.

The remote computer 105 may be programmed to, upon updating the classifications in the GNSS deviation map layer 300, transmit the GNSS deviation map layer 300, e.g., via the network 115. For example, the remote computer 105 may transmit the GNSS deviation map layer 300 to the vehicles 110. The remote computer 105 may combine the GNSS deviation map layer 300 with other map layers and transmit the combined map data as a single transmission to the vehicles 110. The remote computer 105 may transmit the GNSS deviation map layer 300, possibly as part of the combined map data, to other computing devices besides the vehicles 110 that use GNSS-based navigation or mapping applications.

The vehicle computer 120 may be programmed to actuate a component of the vehicle 110 based on the GNSS deviation map layer 300. The component may include, e.g., the propulsion system 140, the brake system 145, the steering system 150, and/or the user interface 155. For example, when the user interface 155 is displaying navigation instructions, the vehicle computer 120 may instruct the user interface 155 to display a message indicating the classification for the geographic area 310 through which the vehicle 110 is traveling. For another example, the vehicle computer 120 may actuate the component in executing an advanced driver assistance system (ADAS). ADAS are groups of electronic technologies that assist drivers in driving and parking functions. Examples of ADAS include forward proximity detection, lane-departure detection, blind-spot detection, braking actuation, adaptive cruise control, and lane-keeping assistance systems. As one example, the GNSS deviation map layer 300 may affect the operation of an automated lane-change feature. The vehicle computer 120 may execute the automated lane-change feature by instructing the steering system 150 to direct the vehicle 110 from a current lane to a target lane adjacent to the current lane in response to an input from an operator and sensor data indicating that the target lane is clear. The automated lane-change feature may be active while the adaptive cruise control and lane-keeping assistance systems are active. The vehicle computer 120 may deactivate the automated lane-change feature in response to the GNSS deviation map layer 300 indicating that the geographic area 310 through which the vehicle 110 is traveling has a classification unsuitable for lane-level position detection, e.g., suitable only for road-level position detection or unsuitable for road-level position detection, e.g., the first through fifth potential classifications. The vehicle computer 120 may maintain the automated lane-change feature as active in response to the GNSS deviation map layer 300 indicating that the geographic area 310 through which the vehicle 110 is traveling has a classification suitable for lane-level position detection, e.g., the sixth potential classification. Alternatively, the vehicle computer 120 may execute the automated lane-change feature based on GNSS data and sensor data in response to the GNSS deviation map layer 300 indicating that the geographic area 310 has a classification suitable for lane-level position detection, and the vehicle computer 120 may execute the automated lane-change feature based on the sensor data but not the GNSS data in response to the GNSS deviation map layer 300 indicating that the geographic area 310 has a classification unsuitable for lane-level position detection.

Figure 4:
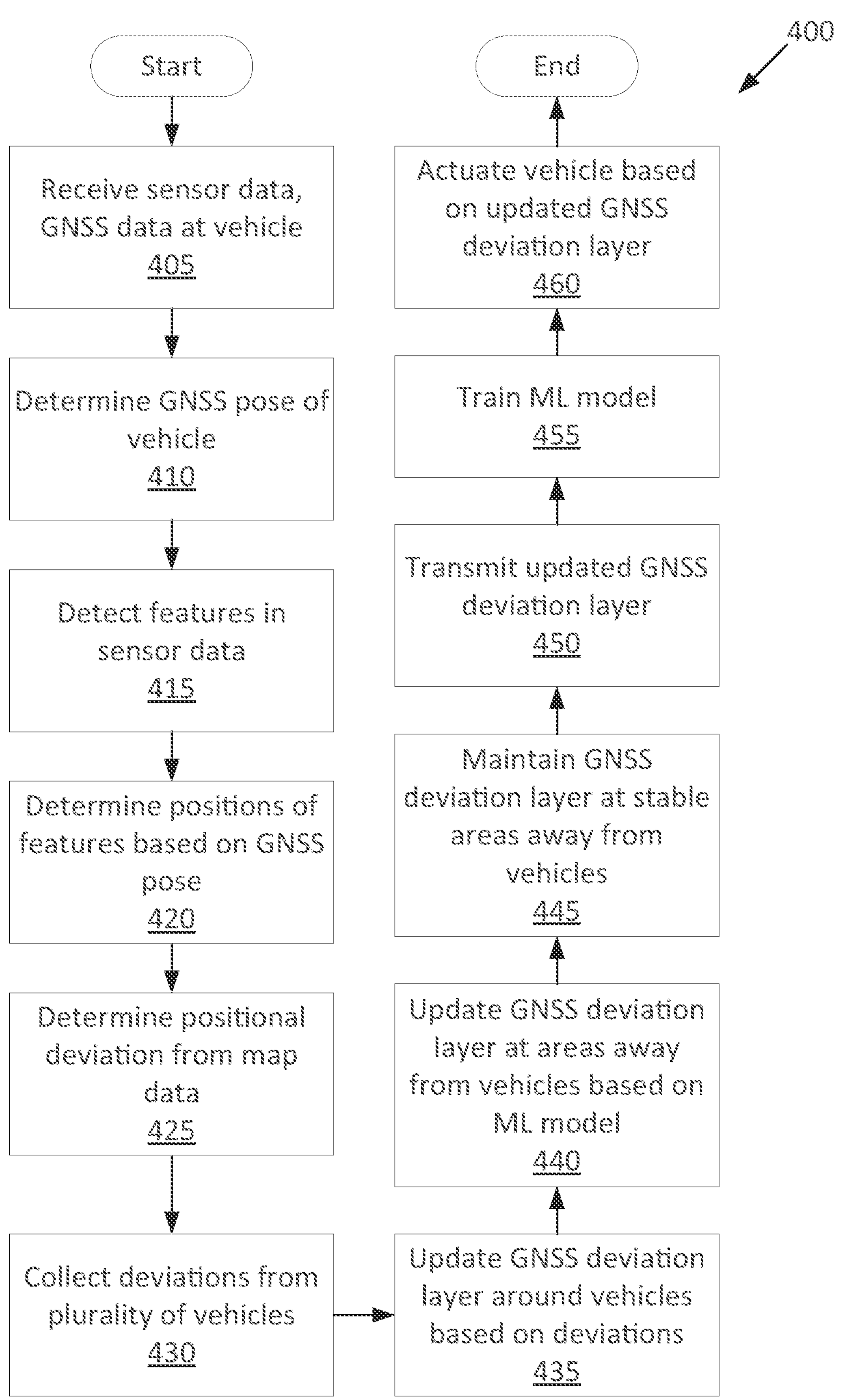
FIG. 4 is a flowchart of an example process for updating the GNSS deviation map layer.

FIG. 4 is a flowchart illustrating an example process 400 for updating the GNSS deviation map layer 300. The memory of the computer stores executable instructions for performing the steps of the process 400 and/or programming can be implemented in structures such as mentioned above. As a general overview of the process 400, the vehicle computer 120 receives the sensor data and the GNSS data and determines the GNSS pose of the vehicle 110. The vehicle computer 120 or the remote computer 105 detects the features in the sensor data, determines the expected positions 210 of the features, and determines the positional deviation. The foregoing steps may be performed independently by each vehicle computer 120, and/or the foregoing steps may be performed by the remote computer 105 once for each vehicle 110. The remote computer 105 collects the positional deviations from a plurality of the vehicles 110, updates the classifications in the GNSS deviation map layer 300 for the geographic areas 310 containing the vehicles 110, updates the classifications in the GNSS deviation map layer 300 for other geographic areas 310 by executing the machine-learning program, maintains the classifications for the remaining geographic areas 310 at the same values as before the update, transmits the GNSS deviation map layer 300, and trains the machine-learning program. The vehicle computer 120 actuates a component based on the GNSS deviation map layer 300.

The process 400 begins in a block 405, in which the vehicle computer 120 receives the sensor data from the sensors and the GNSS data from the GNSS receiver 135, as described above.

Next, in a block 410, the vehicle computer 120 determines the GNSS pose of the vehicle 110, as described above.

Next, in a block 415, the vehicle computer 120 or the remote computer 105 detects the features in the sensor data, as described above.

Next, in a block 420, the vehicle computer 120 or the remote computer 105 determines the expected positions 210 of the features based on the sensor data showing the features and the GNSS pose, as described above.

Next, in a block 425, the vehicle computer 120 or the remote computer 105 determines the positional deviation for the vehicle 110 based on the expected positions 210 and the map positions 205 of the features, as described above.

Next, in a block 430, the remote computer 105 receives the positional deviations for the vehicles 110, as described above.

Next, in a block 435, the remote computer 105 updates the classifications for the geographic areas 310 that contain the vehicles 110 to match the positional deviations and covariances received from the respective vehicles 110, as described above.

Next, in a block 440, the remote computer 105 updates the classifications for some or all of the geographic areas 310 that lack any of the vehicles 110 by executing the machine-learning program, as described above.

Next, in a block 445, the remote computer 105 maintains the classifications for any geographic areas 310 that lack any of the vehicles 110 and were not updated in the block 440, as described above.

Next, in a block 450, the remote computer 105 transmits the GNSS deviation map layer 300 to the vehicles 110 and possibly other devices, as described above.

Next, in a block 455, the remote computer 105 updates the training of the machine-learning program, as described above.

Next, in a block 460, the vehicle computer 120 actuates a component based on the GNSS deviation map layer 300, as described above. After the block 460, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first," "second," "third," etc. are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

receive a positional deviation for a vehicle, the positional deviation based on sensor data generated by environmental sensors on board the vehicle, map data, and global navigation satellite system (GNSS) data received at the vehicle, the positional deviation indicating a difference between a GNSS pose of the vehicle derived from the GNSS data and a localized position of the vehicle indicated by the sensor data and the map data;

update a classification of a geographic area in a GNSS deviation map layer based on the positional deviation, the GNSS deviation map layer indicating a reliability of the GNSS data; and select the classification from a preset plurality of potential classifications stored in the memory.

2. The computer of claim 1, wherein the instructions further include instructions to update the classification based on the positional deviation and based on a covariance of the GNSS data received at the vehicle.

3. The computer of claim 2, wherein the instructions further include instructions to select a first potential classification as the classification in response to the positional deviation exceeding a first threshold and the covariance being below a second threshold, and select a second potential classification as the classification in response to the positional deviation exceeding the first threshold and the covariance exceeding the second threshold.

4. The computer of claim 1, wherein the vehicle is a first vehicle of a plurality of vehicles, the positional deviation is a first positional deviation of a plurality of positional deviations of the respective vehicles, the classification is a first classification of a plurality of classifications of the GNSS deviation map layer, and the instructions further include instructions to update the classifications based on the positional deviations.

5. The computer of claim 4, wherein the geographic area is a first geographic area, the classifications include a second classification of a second geographic area that lacks any of the vehicles, and the instructions further include instructions to update the second classification by executing a machine-learning program that generates an output indicating an expected classification.

6. The computer of claim 5, wherein the instructions further include instructions to train the machine-learning program with the positional deviations as training data.

7. The computer of claim 5, wherein the instructions further include instructions to update the second classification by executing the machine-learning program in response to the second classification of the second geographic area before the update indicating that the reliability of the GNSS data exceeds a threshold in a direction indicating lower reliability.

8. The computer of claim 4, wherein the geographic area is a first geographic area, the classifications include a second classification of a second geographic area that lacks any of the vehicles, and the instructions further include instructions to maintain the second classification at the same value as before the update in response to the second classification of the second geographic area before the update indicating that the reliability of the GNSS data exceeds a threshold in a direction indicating higher reliability.

9. The computer of claim 1, wherein the instructions further include instructions to determine the positional deviation based on the sensor data, the map data, and the GNSS data.

10. The computer of claim 9, wherein the instructions further include instructions to determine the positional deviation by detecting features in the sensor data, the positional deviation being a difference between expected positions of the features based on the GNSS data and map positions of the features from the map data.

11. The computer of claim 10, wherein the instructions further include instructions to determine the positional deviation by determining the expected positions of the features based on the GNSS pose of the vehicle derived from the GNSS data.

12. The computer of claim 11, wherein the instructions further include instructions to determine the positional deviation by executing an optimization algorithm matching the expected positions to the map positions.

13. The computer of claim 1, wherein the potential classifications include at least one first potential classification indicating that the reliability is at least suitable for road-level position detection and at least one second potential classification indicating that the reliability is unsuitable for road-level position detection.

14. The computer of claim 13, wherein the potential classifications include at least one third potential classification indicating that the reliability is at least suitable for lane-level position detection.

15. The computer of claim 1, wherein the potential classifications include at least one first potential classification indicating that the positional deviation is above a threshold and at least one second potential classification indicating that the positional deviation is below the threshold.

16. The computer of claim 15, wherein the threshold is a first threshold, the at least one second potential classification indicates that the positional deviation is below the first threshold and above a second threshold, and the potential classifications include at least one third potential classification indicating that the positional deviation is below the second threshold.

17. A method comprising:

receiving a positional deviation for a vehicle, the positional deviation based on sensor data generated by environmental sensors on board the vehicle, map data, and global navigation satellite system (GNSS) data received at the vehicle, the positional deviation indicating a difference between a GNSS pose of the vehicle derived from the GNSS data and a localized position of the vehicle indicated by the sensor data and the map data;

updating a classification of a geographic area in a GNSS deviation map layer based on the positional deviation, the GNSS deviation map layer indicating a reliability of the GNSS data; and selecting the classification from a preset plurality of potential classifications stored in a memory.

18. The method of claim 17, further comprising determining the positional deviation by detecting features in the sensor data, the positional deviation indicating a difference between expected positions of the features based on the GNSS data and map positions of the features from the map data.

19. The method of claim 18, further comprising determining the positional deviation by determining the expected positions of the features based on the GNSS pose of the vehicle derived from the GNSS data.

20. A computer comprising a processor and a memory, the memory storing instructions executable by the processor to:

receive a plurality of positional deviations for a plurality of respective vehicles including a first positional deviation of a first vehicle, the first positional deviation based on sensor data generated by environmental sensors on board the first vehicle, map data, and global navigation satellite system (GNSS) data received at the first vehicle, the first positional deviation indicating a difference between a GNSS pose of the first vehicle derived from the GNSS data and a localized position of the first vehicle indicated by the sensor data and the map data;

update a first classification of a first geographic area in a GNSS deviation map layer based on the first positional deviation, the GNSS deviation map layer indicating a reliability of the GNSS data, wherein classifications for the GNSS deviation map layer include the first classification and a second classification of a second geographic area that lacks any of the vehicles;

update the classifications based on the positional deviations; and update the second classification by executing a machine-learning program that generates an output indicating an expected classification.

* * * * *